MAGNETIC SYSTEMS

Filed Feb. 12, 1958 2 Sheets-Sheet 1

INVENTORS.
Franz L. Putzrath &
Laurence F. Coker
BY
ATTORNEY.

INVENTORS.
Franz L. Putzrath &
Laurence F. Coker
BY
ATTORNEY.

3,241,128
MAGNETIC SYSTEMS

Franz L. Putzrath, Oaklyn, N.J., and Lawrence F. Coker, Houston, Tex., assignors to Radio Corporation of America, a corporation of Delaware Filed Feb. 12, 1958, Ser. No. 714,813
11 Claims. (Cl. 340—174)

This invention relates to magnetic systems, and particularly to magnetic memory systems.

Memories using magnetic cores of rectangular hysteresis loop material are extensively used in information-handling systems. In certain prior magnetic-core memory systems, such as the coincident-current type, each core serves to store a separate binary digit. When the stored digit is read out of the core, either a relatively large-amplitude signal or a relatively small-amplitude signal is produced. The two different amplitudes of the read-out signal correspond to the one or the other of the states "1" and "0" of the stored digit. In other magnetic-core memory systems, a single core may be used to accumulate different quantized units of data. When the stored data is read out of the core, the relative amplitude of the output signal corresponds to the amount of data previously stored. In the latter systems, the separate units of the quantized data are not maintained in separate locations within the core.

The principal object of the present invention is to provide improved magnetic systems of the type wherein discrete units of data or information are stored within a single magnetic core.

Another object of the present invention is to provide improved methods of, and means for, using a single magnetic core for storing a train of coded information signals.

A further object of the present invention is to provide novel methods of, and means for, storing coded information signals in magnetic cores.

In memory systems according to the present invention, a plurality of information signals are each stored in a different radial portion of a single magnetic core. The two possible senses of flux flow in any radial portion respectively correspond, for example, to the two states "1" and "0" of a binary coded signal. The stored information is read out of the core by successively interrogating each radial core portion. A unique output waveform is induced in an output winding linked to the core for each different combination of binary digits stored in the core.

Figure 1:
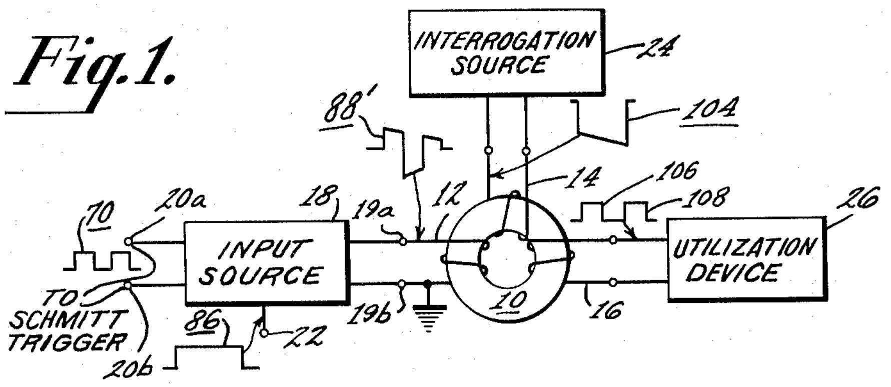
FIG. 1 is a schematic diagram of a memory system according to the invention.
Figure 6:
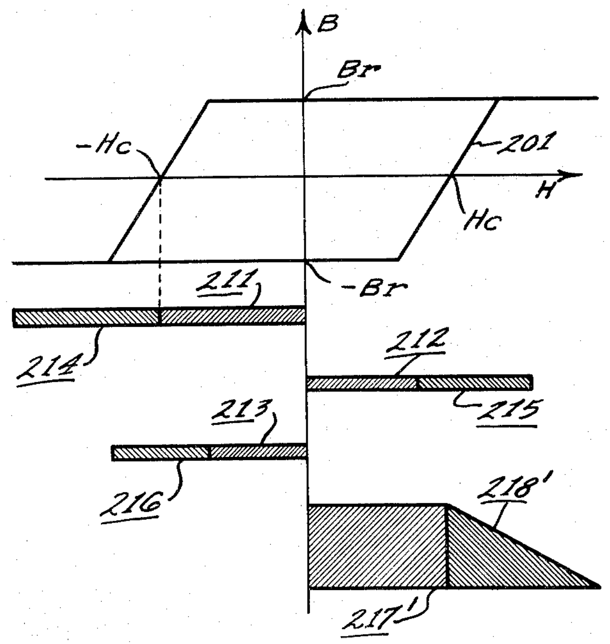
FIG. 6 is a graph of a hysteresis characteristic of one of the cores of FIG. 4 and useful in explaining the operation of the system of FIG. 4.

In FIG. 1, for example, a single-apertured core 10 is used for storing the information signals applied to an input winding 12 linking the core 10. The core 10 is of substantially rectangular hysteresis loop magnetic material such as manganese magnesium zinc ferrite material. An idealized rectangular hysteresis characteristic for the core 10 is shown in FIG. 6 and is described more fully hereinafter. This so-called rectangular hysteresis characteristic is well-known in the information-handling art.

Also linked to the core 10 is an interrogation winding 14 and an output winding 16. Each of the windings 12, 14 and 16, linked to the core 10, may have one turn, but preferably is provided with a plurality of turns. For convenience of drawing, each winding is shown with two turns. The terminals of the input winding 12 are connected to the outputs of an input source 18, described more fully hereinafter in connection with FIG. 2. The input source 18 has a pair of input terminals **20*a*, 20*b* for receiving input signals representing information desired to be stored in the core 10. The input source 18 also has a gating terminal 22. The terminals of the interrogation winding 14 are connected to the outputs of an interrogation source 24. The terminals of the output winding 16 are connected to a utilization device 26**.

Figures 2, 3, 4:
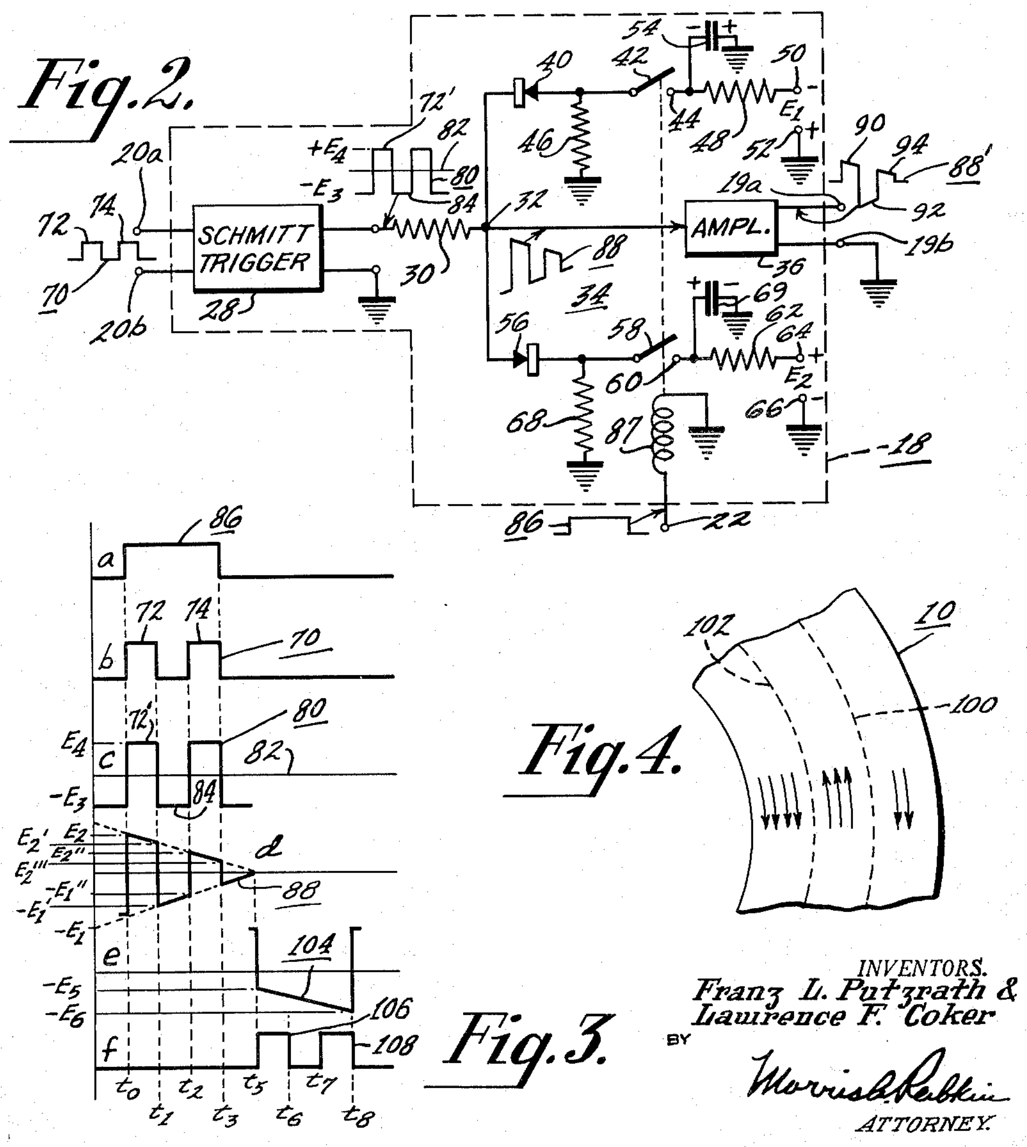
FIG. 2 is a schematic diagram of an input-source device useful in the memory system of FIG. 1.
FIG. 3 is a timing diagram useful in explaining the operation of the system of FIG. 1.
FIG. 4 is a schematic diagram of a portion, somewhat enlarged, of the core of FIG. 1, and useful in explaining the operation of the system of FIG. 1.

As shown in FIG. 2, the input source 18 may include a Schmitt trigger circuit 28 whose inputs are connected to the input terminals **20*a*, 20*b* of the input source 18. One output terminal of the Schmitt trigger 28 is connected to a current-limiting resistor 30. The other resistor 30 terminal is connected to a common junction point 32 of a clamping circuit 34**.

The common junction 32 also is connected to the input of an amplifier circuit 36 having one output connected to the output terminal **19*a* of the input source 18. The other output terminal of the Schmitt trigger 28 and the common terminal 19*b* of the amplifier 36 are connected to a common source of reference potential indicated in the drawing by the conventional ground symbol. The upper portion (as shown in FIG. 2) of the clamping circuit 34 is used to provide a negative clamping action to signals received at the common junction 32, and the lower portion of the clamping circuit 34 is used to provide a positive clamping action to signals received at the common junction 32. The upper portion of the clamping circuit 34 includes a unilateral conducting device, such as a crystal diode 40, having its cathode connected to the common junction 32 and having its anode connected to the movable arm of a single-pole, single-throw switch 42. A resistance element 46 connects the anode of the rectifier 40 and the movable arm of the switch 42 to the common ground. The fixed terminal 44 of the switch 42 is connected in series with a current-limiting resistanse element 48 to the negative terminal 50 of a first source $E_1$ of bias potential. The positive terminal 52 of the bias source $E_1$ is connected to ground. A storage capacitor 54 is connected to ground between the fixed terminal 44 of the switch 42 and the series resistor 48**.

The lower portion of the clamping circuit 34 is similar to the upper portion. A unilateral conducting device, such as the crystal diode 56 oppositely poled with respect to the diode 40, is conneced to the movable arm of another single-pole, single-throw switch 58. The fixed terminal 60 of the switch 58 is connected in series with a resistance element 62 to the positive terminal 64 of another source $E_2$ of bias potential. The negative terminal 66 of the bias source $E_2$ is connected to ground. A resistor 68 is connected to ground between the cathode of the diode 56 and the movable arm of the switch 58. The anode of the diode 56 is connected to the common junction 32. Another storage capacitor 69 is connected to ground between the fixed terminal 60 of the switch 58 and the series resistor 62. If desired, the bias sources $E_1$ and $E_2$ may be of the same potential; and the same source, such as a battery with a grounded tap, may be used for both.

In operation, a train of positive-polarity input pulses, represented by the waveform 70 of FIG. 2, actuates the Schmitt trigger 28. The positive pulses 72 and 74 of the waveform 70 may correspond, for example, to binary "1" digits, and the absence of a pulse in the waveform 70 may correspond to a binary "0" signal. This representation of the two binary digits "1" and "0" correspond to the so-called "return to zero" recording system.

The waveform 70 appears at the output of the Schmitt trigger 28 as the waveform 80 which varies above and below a reference level 82. In the absence of a positive input to the Schmitt trigger 28, its output has a negative potential $-E_3$. The first positive input pulse 72 of the waveform 70 changes the output of the Schmitt trigger 28 from its negative potential $-E_3$ to a positive potential $+E_4$ for the duration of the positive input pulse 72. Upon termination of the positive input pulse 72, the output potential of the Schmitt trigger 28 returns to the negative reference potential $-E_3$. The Schmitt trigger output remains at the lever $-E_3$ until the second positive input pulse 74 is applied. The output of the Schmitt trigger remains at the positive level $E_4$ until the input pulse 74 terminates. At the completion of the input pulse 74, the Schmitt trigger reverts to its $-E_3$ level. The resistance of the current-limiting resistor is larger, say ten times larger, than the resistance of the capacitor discharge resistors 46 and 68. Accordingly, the capacitors 54, 69 discharge in linear fashion from their maximum charged values without being appreciably influenced by the waveform 80 applied to the common junction 32.

Each of the switches 42 and 58 of the clamping circuit 34 is normally open in the absence of a gating pulse 86 applied to the gating terminal 22 of the input source 18. Accordingly, the capacitors 54 and 69 charge, respectively, to the potentials $-E_1$ and $+E_2$ with the left-hand plate (as viewed in the drawing) of the capacitor 54 being negative relative to its right-hand grounded plate, and the left-hand plate of the capacitor 69 being positive relative to its right-hand grounded plate.

Upon application of a gating pulse 86, a current flow is produced in the winding 87 of a relay device which operates to close both the switches 42 and 58. Upon closure of the switches 42 and 58, the capacitors 54 and 68, respectively, begin to discharge through the switches 42, 58 and the resistors 46 and 68.

Assume, now, that the gating pulse 86 is applied at a time $t_0$ to coincide with the leading edge of the first pulse 72 of the waveform 70, as represented in lines *a* and *b* of the timing diagram of FIG. 3. At any instant of time after the closure of the switches 42, 58, the maximum positive value, at that instant, of the waveform 80, at the common junction point 32, is clamped to the voltage of the capacitor 69, and the maximum negative value of the waveform 80 is clamped to the voltage of the other capacitor 54. Thus, between the times $t_0$ and $t_1$, during the first positive pulse 72' of the waveform 80, the potential of the junction point 32 changes from a maximum value $+E_2$ to a lower positive value $+E'_2$ due to the continuing discharge of the capacitor 69, as represented in line *d* of FIG. 3. Between the times $t_1$ and $t_2$, the negative clamping potential of the common junction point 32 changes from a negative value $-E'_1$ to a lesser negative value $-E''_1$. Note that the potential $-E'_1$ is less negative than the potential $-E_1$ due to the discharge of the capacitor 54 between the times $t_0$ and $t_1$. Between the times $t_2$ and $t_3$, the potential of the positive clamping potential of the common junction 32 varies from a maximum positive value $+E''_2$ to a lesser positive value $+E'''_2$. Again, note that the potential $-E''_2$ is less than the potential $+E'_2$ due to the discharge of the capacitor 69 between the times $t_1$ and $t_2$. At the time $t_3$, the gating pulse 86 of line *a* of FIG. 3 is terminated and both capacitors 54 and 69 begin to recharge to their respective values $-E_1$ and $+E_2$.

The resulting waveform at the common junction 32, represented by the waveform 88 of line *d* of FIG. 3, is applied to the input of the amplifier 36. An output waveform 88', similar in shape to the input waveform 88 but of increased current, appears across the output terminals **19*a* and 19*b*. The amplifier 36**, for example, may be a linear current-amplifying device such as a transistor emitter-follower amplifier circuit.

Assume, now, that the core 10 of FIG. 1 initially is in its reset condition, with all the flux therein in one sense, for example, the counterclockwise sense. The flux in the core 10 is returned to its initial counterclockwise sense after each interrogation operation, as will be fully described hereinafter.

The first positive portion 90 of the output waveform 88' causes a current flow in the input winding 12 of the core in a direction to change the flux therein from the counterclockwise to the clockwise sense. Accordingly, upon termination of the positive portion 90 of the output waveform 88', all the flux in the core 10 is changed from the counterclockwise to the clockwise sense. The next negative portion 92 of the output waveform 88' produces a current flow in the opposite direction, in the input winding 12 of the core 10, to change the flux from the clockwise to the counterclockwise sense. Because of the reduced amplitude of the negative portion 92 of the output waveform 88, however, the flux change in the core 10 is limited to a radial portion extending from the inner periphery of the core 10 towards its outer periphery. The flux in the outer portion of the core 10 remains in its clockwise sense, as set by the positive pulse 90. The second positive portion 94 of the output waveform 88' produces another pulse current flow in the input winding 12 in a direction to change the flux from the counterclockwise sense to the clockwise sense. Again, the absolute amplitude of the positive portion 94 is less than that of the negative portion 92 of the waveform 88'. Thus, the resulting flux change in the core 10 is limited to a smaller radial portion extending from the inner periphery of the core 10 towards the outer periphery of the core 10. The three radial regions of flux change resulting from the output waveform 88', applied to the core 10 input winding 12, are indicated schematically in FIG. 4. In the extreme outer radial region, between the outer periphery of the core 10 and the region indicated by the dashed line 100, the flux is in the clockwise sense. In the middle region, between the dashed line 100 and the dashed line 102, the flux is in the initial counterclockwise sense. In the innermost region between the dashed line 102, and the inner periphery of the core 10, the flux is in the clockwise sense.

The representation in FIG. 4 is not intended to be an exact representation of the flux orientation with the core 10, resulting from the output waveform 88'. However, this representation is believed to be sufficiently accurate to permit systems embodying the invention to be built and operated.

The innermost radial portion of the core 10 is believed to be somewhat wider than the middle region which, in turn, is believed to be somewhat wider than the outer region. However, sufficiently sharp demarcation does exist between the three regions to provide distinct output signals during a subsequent readout operation.

During each readout operation, the interrogation source 24 is operated to apply, for example, a negative-going sawtooth pulse 104 to the readout winding 14. As illustrated in line *e* of FIG. 3, the interrogation pulse 104 increases from an initial negative value $-E_5$ towards a greater negative value $-E_6$ between the times $t_5$ and $t_8$. An initial negative value $-E_5$ is sufficient to produce a magnetizing force equal to the coercive force of the core 10 at its inner periphery.

As the interrogation pulse 104 increases in amplitude, sufficient magnetizing force is produced to change the flux in the innermost region of the core 10 from its clockwise to its initial counterclockwise sense. This flux change produces an output pulse in the output winding 16 represented by the pulse 106 of the line $f$ of FIG. 3.

Between the times $t_6$ and $t_7$, the readout pulse 104 produces sufficient magnetizing force to produce a flux reversal in the middle region of the core 10. However, the flux in this region already is in its counterclockwise sense and no appreciable output signal is induced in the output winding 16 between the times $t_6$ and $t_7$. Between the times $t_7$ and $t_8$, the readout pulse 104 produces sufficient magnetizing force to produce a flux reversal in the outer region of the core 10. Accordingly, between times $t_7$ and $t_8$, the flux in the outer region is changed from the clockwise sense to the initial counterclockwise sense, thereby producing another output pulse in the output winding 16, represented by the positive pulse 108 of line $f$ of FIG. 3.

At time $t_8$, the interrogation pulse 104 is terminated, and the flux in the core 10 remains in the counterclockwise sense corresponding to the reset condition of the core 10.

A new train of input pulses then can be applied to the input winding 12 to store the same or a different combination of binary digits in the core 10. The sense of flux in any one of the three radial portions of the core 10 is changed to either the clockwise or the counterclockwise sense, depending upon the combination of binary digits in the subsequently applied information.

The system of the invention also may be used to store other types of coded pulse signals. For example, the input signals to the input source 18 may be coded in the form of non-return-to-zero signals. Observe that the Schmitt trigger circuit of FIG. 2 is not necessary when non-return-to-zero-type signals are used, since these input signals already vary above and below a reference level. Also, the input information may be in the form of analogue-type signals. In the analogue-type of system, each node of the analogue signal is separately represented in a different radial portion of the core 10. By "node" is meant a variation in the input signal from one polarity, with respect to a given reference level, to the opposite polarity with respect to the same reference level.

The input circuit 18 of FIG. 2 represents one suitable type of circuit for use with the invention. Other suitable input circuits are well-known in the art. Thus, any input circuit which functions to symmetrically clamp an input waveform to a linearly decreasing, sawtooth reference potential may be used.

Figure 5:
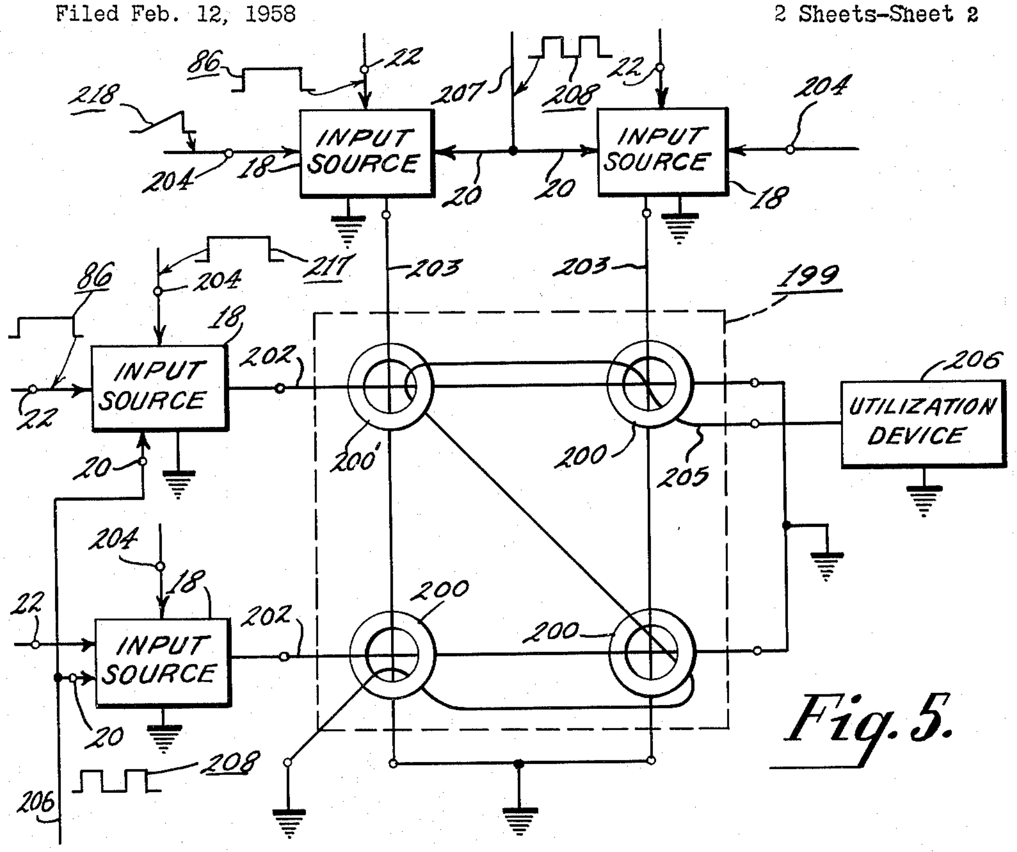
FIG. 5 is a schematic diagram of a memory system according to the invention, using an array of magnetic cores.

The memory systems of the invention also may be adapted for storing information in a matrix of cores, using coincident-current techniques. In FIG. 5, for example, a 2 x 2 matrix 199 of cores 200, each of rectangular hysteresis loop material, is used. FIG. 6 is a graph 201, somewhat idealized, of a plot of the B–H hysteresis loop of any of the cores 200. The two sense of flux orientation in a core 200 are arbitrarily represented in FIG. 6 by the two remanent directions Br and —Br of the induction B. Before a core 200 changes its previous remanent condition by any appreciable amount, a magnetizing force in excess of a coercive force $H_c$ must be applied. Upon termination of an applied magnetizing force less than the coercive force $H_c$, the core returns substantially to its previous remanent condition.

In the memory art, an applied force greater than the coercive force $H_c$ conveniently is termed a full excitation, and an applied force less than the coercive force $H_c$ conveniently is termed a half-excitation force. As many half-excitation forces as desired can be applied without appreciably changing the previous remanent state of a core 200.

Referring again to FIG. 5, each different row of cores 200 is linked by a separate one of the row windings 202; and each different column of cores 200 is linked by a separate one of the column windings 203. A common readout or sensing winding 205 links all the cores 200. The sense in which the sensing winding 205 links the cores 200 alternately reverses with successive ones of the cores 200. A separate input source 18 of FIG. 1 is coupled to each separate row winding 202 and to each separate column winding 203. For reasons more fully described hereinafter, an additional resistance element (not shown) is used to connect the common junction 32 to the input of the amplifier 36 in each input source 18. Interrogation pulses, used in operating the memory system of FIG. 5, are then applied directly to the input of the amplifier 36. The additional resistance element between the common junction 32 and the amplifier offers a relatively high impedance to the interrogation pulses and prevents the low-impedance resistances 46 and 68 from bypassing the interrogation pulses to ground. A suitable impedance for the additional resistance element is a value equal to the input impedance of the amplifier 36. In FIG. 5, the interrogation pulses for each matrix line are applied to an interrogation terminal 204 of the input source 18 associated with that matrix line. Each interrogation terminal 204 is directly connected to the input of the amplifier 36 of its input source 18 in the manner just described.

Assume, now, that it is desired to write a train 208 of three binary digits into the core 200′ at the intersection of the first row and first column. A gating pulse 86 is applied to the gating input 22 of the first row and first column input sources 18. The three digits of the train 28 may be, for example, 101. The pulses representing the input signals are applied simultaneously to the input terminals 20 of all the input row sources 18 via a common row conductor 206, and to the input terminals 20 of all the column input sources 20 via a common column conductor 207. The input source 18 of the first row, due to the simultaneous presence of the gating pulse 86, provides three separate output pulses of successively smaller amplitude, as described above in connection with FIGS. 1 and 2. The input source 18 of the second row of cores does not produce any output because the common junction point 32 (FIG. 2) is clamped at ground potential in the absence of a gating pulse 86. The three output pulses of the first row input source 18 are represented in FIG. 6 by the positive pulses 211 and 213 beneath the curve 201 and by the negative pulse 212. The two positive pulses 211, 213 correspond to the two binary "1" digits, and the negative pulse 212 corresopnds to the binary "0" digit. Observe that each of the pulses 211, 212 and 213 alone does not produce a magnetizing force in excess of the coercive force $H_c$ of any core 200. Therefore, substantially no flux change is produced in any of the cores 200 of the first row of the matrix 199 of FIG. 5. The input signals to the first column input source 18 similarly cause three corresponding output signals respectively coincident with the three row output signals 211, 212 and 213. No output signals are produced by the second column source 18 due to the absence of the gating pulse 86 at its gating input 22. The first and third output signals of the first column source 18 are positive as represented by the positive pulses 214 and 216 of FIG. 6. The second of the three-column output signals is negative, as represented by the negative pulse 215 of FIG. 5. The three-column output signals also produce separate magnetizing forces each less than the coercive force $H_c$ of any core 200. Therefore, none of the cores 200 of the first column of the matrix 199 of FIG. 5 has any appreciable flux change produced therein as a result of the column pulses 214–216 alone. The three column pulses 214, 215 and 216 also are of successively smaller amplitude.

The selected core 200′ receives both row and column excitations. The first positive row and column pulses 211 and 214 are additive in the core 200′ to write the first binary "1" digit; the second negative row and column pulses 212 and 215 are additive in the core 200′ to write the binary "0" digit, and the third positive row and column pulses 213 and 216 are additive in the core 200′ to write the second binary "1" digit. A train of binary digits may be written into any other selected one of the cores 200 in similar fashion.

Coincident-current readout also is used in the system of FIG. 5. For example, the information stored in the first row and first column core 200′ is read out as follows: An interrogation pulse 217 is applied to the interrogation input 204 of the first row source 18 to apply a positive interrogation pulse 217 to the coupled row winding 202. The positive output pulse of the first row input source 18 is regulated to produce a coercive force less than the coercive force $H_c$ of any core 200, as indicated in FIG. 6, by the positive pulse 217′. At the same time, a sawtooth pulse 218 of increasing amplitude is applied to the interrogation input 204 of the first column input source 18 to apply a corresponding pulse 218′ to the first column row winding 203. The maximum value of the sawtooth column pulse also produces a magnetizing force less than the coercive force of any core 200, as indicated by the sawtooth pulse 218′ of FIG. 6.

Observe that no gating pulses 36 are applied during the read operation. Coincidence of the row and column read pulses 217′ and 218′ in the selected core 200′ sequentially interrogates the successive outer radial portions of that core 200′, as described above in connection with FIGS. 1 and 2. The resulting output signal induced in the sensing winding 205 represents the train of binary digits previously stored in the selected core 200′. The output signal of the sensing winding 205 is applied to a utilization device 206 connected across the sensing winding 205.

There have been described herein novel methods of, and systems for, storing information in magnetic elements. Other suitable known circuits may be used for performing the functions of the exemplary circuits, such as the input source 18 of FIGS. 2 and 5, as will be apparent to those skilled in the art.

What is claimed is:

1. In a magnetic system, the combination comprising a core of substantially rectangular hysteresis loop material, said core having two directions of magnetization, an input winding linked to said core, and means including an input source for storing a plurality of information signals one after the other in said core, said input source including means for applying to said input winding separate input pulses of either one or the other polarity and of successively smaller amplitude, the first of said input pulses being sufficient in amplitude to magnetize the entire core to a desired one of said directions of magnetization for storing one of said plurality of signals and the last of said input pulses being sufficient in amplitude to magnetize only an inner circumferential portion of said core to a desired one of said directions of magnetization for storing the last of said plurality of signals.

2. In a magnetic system, the combination comprising a core of substantially rectangular hysteresis loop material having two directions of magnetization, an input winding linked to said core, and means including an input source for storing different information digits one after the other in said core, said input source including means for applying to said input winding separate input pulses of either one or the other polarity in accordance with whether binary "one" or binary "zero" digits are to be stored, means for successively reducing the amplitude of successive input pulses, the first of said input pulses being sufficient in amplitude to magnetize the entire core to a desired one of said directions of magnetization to store one of said information digits, and the last of said input pulses being sufficient in amplitude to magnetize only an inner portion of said core to a desired one of said directions of magnetization to store another of said information digits.

3. In a magnetic system, the combination as claimed in claim 2, including an interrogation winding linked to said core for reading out information stored therein, means for applying an interrogation signal to said interrogation winding, said interrogation signal increasing in amplitude in continuous fashion to scan said core from the innermost portion thereof to the outermost portion thereof, and an output winding linked to said core, signals induced in said output winding during the application of said interrogation signal corresponding to the information stored in said core.

4. In a magnetic system, the combination comprising a plurality of cores arranged in rows and columns, each of said cores being of substantially rectanguler hysteresis loop material and each of said cores having two directions of magnetization, a separate row winding linking each separate row of cores, a separate column winding linking each separate said column of said cores, a plurality of row and column input sources, a different said row source being connected to each different said row winding and a different said column source being connected to each different said column winding, each said input source including means for applying to its connected winding separate input pulses of either one or the other polarity and means for successively reducing the amplitude of successive ones of said input pulses, the first of said row and column input pulses together being sufficient in amplitude to magnetize any one of said cores to a desired direction of magnetization, the last of said row and column input pulses together being sufficient in amplitude to magntize only an inner, circumferential portion of any one of said cores to a desired direction of magnetization, any one of said row and column pulses alone being insufficient in amplitude to change the magnetization of any one of said cores, and means for storing a plurality of information digits one after the other in a selected one of said cores comprising means for activating at the same time the said row and the said column input sources connected to the said row and column windings of said selected core to apply a plurality of said separate input pulses to said selected core row and column windings.

5. In a memory system including a magnetic core of substantially rectangular hysteresis loop material, said material having two directions of remanent magnetization, means for storing information corresponding to a succession of information signals in said core comprising means for applying to said core a magnetizing force which decreases in amplitude from an initial amplitude to zero amplitude, and means responsive to successive ones of said information signals for reversing the polarity of said applied magnetizing force for each successive one of said information signals.

6. In a memory system having a core of substantially rectangular hysteresis loop material, said material having two directions of magnetization, means for storing a train of binary information signals in said core, each of said signals being stored in a different circumferential portion of said core, successive ones of the signals of said train being stored in circumferential portions of different radii with the first signal of said train being stored in the radially outermost one of said portions and the last signal of said train being stored in the radially innermost one of said portions, comprising means for applying a magnetizing force of either one or the other polarity to said core, the amplitude of said magnetizing force decreasing from an initial value sufficient to magnetize the said outermost portion to a value insufficient to change the magnetization of the said innermost portion, and means responsive to each different signal of said train for controlling the polarity of said applied force, said one polarity force being applied for one binary value of a said information signal and said other polarity force being applied for the other binary value of said information signal.

7. In a memory system including an array of magnetic cores of substantially rectangular hysteresis loop material, each said core having two directions or remanent magnetization, said array having a separate row winding linked to each row of said cores, and a separate column winding linked to each column of said cores, means for storing information corresponding to binary one and zero information signals in said array comprising means for selecting a desired core of said array, means for applying to both the row and column windings of said selected core separate magnetizing forces each of which decreases in amplitude from an initial amplitude to zero amplitude, and means responsive to said information signals for reversing the polarity of said applied forces each time successive ones of said information signals have different binary values, the maximum amplitude of any one of said applied forces being insufficient to change the magnetization of any one of said array cores, and the combined magnetizing forces applied to said selected core being sufficient to change the magnetization of that core, whereby said applied magnetizing forces store information only in said selected core.

8. In a memory system as recited in claim 7, means for reading out the information stored in a desired one of said cores comprising first and second means for applying first and second excitation signals to the row and column windings of the desired core, said first excitation signals increasing from an initially low value to an initially high value in linear fashion, and said second excitation signals being of constant amplitude, whereby the information signals stored in said desired core are sequentially read out.

9. In a magnetic system, the combination comprising a single-apertured core of substantially rectangular hysteresis loop material, said core having two directions of magnetization, an input winding linked to said core, and means including an input source for storing information in said core, said input source applying to said input winding separate input pulses of either one or the other polarity and of successively smaller amplitude, the first of said input pulses being sufficient in amplitude to magnetize the entire core to a desired one of said directions of magnetization, and the last of said input pulses being sufficient in amplitude to magnetize only an inner circumferential portion of said core to a desired one of said directions of magnetization.

10. A core memory device for successively storing a group of binary information bits in the form of coded electrical signals, comprising a magnetic core having a high flux retentivity characteristic, the core having a central aperture therein, a winding wound on the core for electrically inducing magnetic flux in the core in concentric paths around the aperture, means responsive to the coded electrical signals for pulsing the winding with current in response to each binary information bit, means responsive to the coded electrical signals for controlling the direction of the current pulsed through the winding according to the digital value of the binary bits, and means for continuously decreasing the magnitude of successive current pulses in response to each of the binary bits in the group to be stored, whereby the bits are stored as flux having particular directions around the aperture in concentric zones in the core.

11. A core storage device for storing a succession of binary information bits comprising an annular magnetic core having a substantially rectangular hysteresis loop characteristic, means including windings linking the core for applying to the core a magnetizing field pulsed in synchronism with the succession of information bits and of decreasing magnitude, means for controlling the polarity of the pulsed magnetic field in response to the binary values of the successive information bits, whereby successive bits are stored as concentric magnetized zones in the core in which the direction of the flux in the zones is indicative of the value of the corresponding binary information bit, and means for reading out the information bits including means for successively forcing the flux in the concentric zones in one direction and means for sensing the reversal of flux in the zones in which stored flux is reversed during readout.

References Cited by the Examiner

UNITED STATES PATENTS

| | | | |
|---|---|---|---|
| 2,691,155 | 10/1954 | Rosenberg et al. | 340—174 |
| 2,691,156 | 10/1954 | Saltz et al. | 340—174 |
| 2,803,812 | 8/1957 | Rajchman et al. | 340—174 |
| 2,805,408 | 9/1957 | Hamilton | 340—174 |
| 2,814,792 | 11/1957 | Lamy | 340—174 |
| 2,870,433 | 1/1959 | Simpson | 340—174 |
| 2,951,245 | 8/1960 | Kihn | 340—174 |
| 2,952,840 | 9/1960 | Ridler et al. | 340—174 |

FOREIGN PATENTS

| | | |
|---|---|---|
| 760,048 | 10/1956 | Great Britain. |
| 780,884 | 8/1957 | Great Britain. |

OTHER REFERENCES

Rajchman and Lo: "The Transfluxor," RCA Review, vol.16, June 1955, pages 303–311.

IRE Proceedings: vol. 44, Issue No. 3, "The Transfluxor," by J. A. Rajchman and A. W. Lo, March 1956, pages 321–332.

IRVING L. SRAGOW, *Primary Examiner.*

EVERETT R. REYNOLDS, JOHN F. BURNS, STEPHEN W. CAPELLI, *Examiners.*